United States Patent
Ashwood-Smith et al.

(10) Patent No.: US 8,873,401 B2
(45) Date of Patent: Oct. 28, 2014

(54) SERVICE PRIORITIZATION IN LINK STATE CONTROLLED LAYER TWO NETWORKS

(75) Inventors: Peter Ashwood-Smith, Gatineau (CA); Yin Guoli, Ottawa (CA); Zhang Xuejiang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 16 days.

(21) Appl. No.: 13/013,394

(22) Filed: Jan. 25, 2011

(65) Prior Publication Data
US 2011/0228780 A1 Sep. 22, 2011

Related U.S. Application Data

(60) Provisional application No. 61/314,445, filed on Mar. 16, 2010.

(51) Int. Cl.
| H04L 12/26 | (2006.01) |
| H04L 12/703 | (2013.01) |
| H04L 12/46 | (2006.01) |
| H04L 12/751 | (2013.01) |

(52) U.S. Cl.
CPC ............ *H04L 45/28* (2013.01); *H04L 12/4641* (2013.01); *H04L 45/026* (2013.01)
USPC .......................................... 370/242; 370/216

(58) Field of Classification Search
None
See application file for complete search history.

(56) References Cited

U.S. PATENT DOCUMENTS

| 6,456,587 | B2 * | 9/2002 | Taniguchi ..................... 370/216 |
| 7,333,438 | B1 * | 2/2008 | Rabie et al. .................. 370/242 |
| 7,693,164 | B1 * | 4/2010 | Busch et al. .................. 370/401 |
| 7,996,559 | B2 * | 8/2011 | Mohan et al. ................. 709/242 |
| 8,045,570 | B2 * | 10/2011 | Allan et al. .................... 370/401 |
| 2001/0033551 | A1 * | 10/2001 | Busuioc et al. ................ 370/270 |
| 2002/0022462 | A1 * | 2/2002 | Schill et al. ................. 455/186.1 |
| 2002/0069279 | A1 * | 6/2002 | Romero et al. ............... 709/225 |
| 2002/0166128 | A1 * | 11/2002 | Ikeda et al. ................... 725/112 |
| 2003/0105841 | A1 * | 6/2003 | Miyake et al. ................ 709/220 |
| 2004/0125801 | A1 * | 7/2004 | Nawata ......................... 370/389 |

(Continued)

FOREIGN PATENT DOCUMENTS

| CN | 1352862 A | 6/2002 |
| CN | 1889701 A | 1/2007 |

(Continued)

OTHER PUBLICATIONS

Provider Link State Bridging—2008.*

(Continued)

*Primary Examiner* — Marsha D Banks Harold
*Assistant Examiner* — Christopher Wyllie
(74) *Attorney, Agent, or Firm* — Conley Rose, P.C.; Grant Rodolph; Brandt D. Howell

(57) ABSTRACT

An apparatus comprising a node configured to maintain a plurality of downloaded forwarding states for a plurality of link state based services that are associated with the node and a plurality of other nodes in a network comprising the node, and a plurality of advertised service identifiers (IDs) that correspond to the link state based services, wherein the service IDs are ordered in sequence from higher priority to lower priority link state based services, and wherein work is instantiated at the node according to the ordered sequence from higher priority to lower priority link state based services.

19 Claims, 4 Drawing Sheets

(56) References Cited

U.S. PATENT DOCUMENTS

| | | | | |
|---|---|---|---|---|
| 2004/0252635 | A1* | 12/2004 | Kasper | 370/216 |
| 2005/0114448 | A1* | 5/2005 | Skomra | 709/204 |
| 2005/0192021 | A1* | 9/2005 | Lee et al. | 455/452.2 |
| 2005/0195741 | A1* | 9/2005 | Doshi et al. | 370/230 |
| 2005/0265397 | A1* | 12/2005 | Chapman et al. | 370/490 |
| 2006/0140136 | A1* | 6/2006 | Filsfils et al. | 370/255 |
| 2006/0198316 | A1* | 9/2006 | Bhagwat et al. | 370/252 |
| 2006/0212348 | A1* | 9/2006 | Lambert et al. | 705/14 |
| 2007/0086361 | A1* | 4/2007 | Allan et al. | 370/254 |
| 2007/0217421 | A1* | 9/2007 | Kametani et al. | 370/392 |
| 2008/0025250 | A1* | 1/2008 | Wang et al. | 370/328 |
| 2008/0049609 | A1* | 2/2008 | Chao et al. | 370/218 |
| 2008/0107027 | A1* | 5/2008 | Allan et al. | 370/235 |
| 2008/0117902 | A1* | 5/2008 | Vinneras | 370/389 |
| 2008/0144644 | A1* | 6/2008 | Allan et al. | 370/401 |
| 2008/0273553 | A1* | 11/2008 | Wang et al. | 370/468 |
| 2009/0168666 | A1* | 7/2009 | Unbehagen et al. | 370/254 |
| 2009/0232005 | A1* | 9/2009 | Mohan et al. | 370/241.1 |
| 2009/0234969 | A1* | 9/2009 | Mohan et al. | 709/242 |
| 2009/0264094 | A1* | 10/2009 | Smith | 455/404.2 |
| 2010/0080238 | A1* | 4/2010 | Allan et al. | 370/401 |
| 2011/0060950 | A1* | 3/2011 | Waldron et al. | 714/48 |
| 2011/0170403 | A1* | 7/2011 | Ashwood-Smith et al. | 370/216 |

FOREIGN PATENT DOCUMENTS

| | | |
|---|---|---|
| CN | 101068379 A | 11/2007 |
| EP | 1542400 A2 | 6/2005 |
| NZ | 525951 A | 7/2005 |
| WO | 9824244 A2 | 6/1998 |
| WO | 9841041 A1 | 9/1998 |
| WO | 0042789 A1 | 7/2000 |

OTHER PUBLICATIONS

Provider Link State Bridging (PLSB) by Don Fedyk and Paul Bottorff, Nortel Networks Jan. 2007.*

Provider Link State Bridging David Allan, Peter Ashwood-Smith, Nigel Bragg, and Don Fedyk, Norte 2008.*

Foreign Communication From a Related Counterpart Application—International Search Report, PCT/CN2011/071414, Jun. 9, 2011, 4 pages.

Foreign Communication From a Related Counterpart Application—Written Opinion of the International Searching Authority, PCT/CN2011/071414, Jun. 9, 2011, 5 pages.

Foreign Communication From a Counterpart Application, European Application No. 11755640.7, Extended European Search Report dated Jun. 28, 2013, 8 pages.

"IEEE Standard for Local and Metropolitan Area Networks, Virtual Bridged Local Area Networks, IEEE Computer Society," IEEE Std 802.1Q, New York, May 19, 2006, 301 pages.

"Draft Standard for Local and Metropolitan Area Networks, Virtual Bridged Local Area Networks, Amendment 9: Shortest Path Bridging," IEEE P802.1aq/D1.5, Draft Amendment to IEEE Std, Dec. 17, 2008, 198 pages.

Perlman, R., et al., "Rbridges: Base Protocol Specification," draft-ietf-trill-rbridge-protocol-12.txt, Trill Working Group, Internet-Draft, Mar. 6, 2009, 96 pages.

Allan, D., et al., "New Innovations in Ethernet: Provider Link State Bridging," Nortel Technical Journal, Issue 6, 2008, pp. 21-30.

Fedyk, D., et al., "Provider Link State Bridging (PLSB)," Jan. 2007, 10 pages.

Banerjee, Ed., A., "Extensions to IS-IS for Layer-2 Systems," draft-ietf-isis-layer2-01.txt, Network Working Group, Internet Draft, Jul. 11, 2009, 39 pages.

Allan, D., et al., "Provider Link State Bridging," Carrier Scale Ethernet, IEEE Communications Magazine, Sep. 2008, pp. 2-9.

Foreign Communication From a Related Counterpart Application—Chinese Application No. 201010592425.8, Chinese Office Action dated Jan. 14, 2013, 6 pages.

Foreign Communication From a Related Counterpart Application—Chinese Application No. 201010592425.8, Partial Translation of Chinese Office Action dated Jan. 14, 2013, 4 pages.

Foreign Communication From a Counterpart Application, European Application No. 11755640.7, European Search Report dated Jan. 27, 2014, 6 pages.

* cited by examiner

SERVICE PRIORITIZATION IN LINK STATE CONTROLLED LAYER TWO NETWORKS

CROSS-REFERENCE TO RELATED APPLICATIONS

The present application claims the benefit of U.S. Provisional Patent Application No. 61/314,445, filed Mar. 16, 2010 by Peter Ashwood-Smith et al., and entitled "Service Prioritization in Link State Controlled Layer 2 Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communications and data networks are comprised of nodes that transport data through the network. The nodes may include routers, switches, bridges, or combinations thereof that transport the individual data packets or frames through the network. Some networks may offer data services that forward data frames from one node to another node across the network without using pre-configured routes on the intermediate nodes. Other networks may forward the data frames from one node to another node across the network along pre-configured or pre-established paths. In some networks, the nodes may create Ethernet-Local Area Network (E-LAN) services, where traffic that corresponds to different services may be transported along different sub-networks, e.g. by different subsets of nodes. For example, the E-LAN services may comprise Institute of Electrical and Electronics Engineers (IEEE) 802.1aq network services or Virtual Private LAN Services (VPLS).

SUMMARY

In one embodiment, the disclosure includes an apparatus comprising a node configured to maintain a plurality of downloaded forwarding states for a plurality of link state based services that are associated with the node and a plurality of other nodes in a network comprising the node, and a plurality of advertised service identifiers (IDs) that correspond to the link state based services, wherein the service IDs are ordered in sequence from higher priority to lower priority link state based services, and wherein work is instantiated at the node according to the ordered sequence from higher priority to lower priority link state based services.

In another embodiment, the disclosure includes a network component comprising a receiver configured to receive a plurality of ordered service IDs that correspond to a plurality of services, a circuit configured to order the service IDs in sequence based on the priorities of the corresponding services from higher priority to lower priority services, and a transmitter configured to transmit the ordered service IDs and a plurality of forwarding states that correspond to the services in the sequence from higher priority to lower priority services.

In a third embodiment, the disclosure includes a computer-implemented method comprising ordering a plurality of link state based services based on a plurality of advertised ranks for the link state based services, ordering a plurality of nodes based on the ranks for the link state based services that are originated by the nodes, computing a plurality of forwarding states for the link state based services considering first the nodes that have higher order, and downloading the calculated forwarding states for the higher ranked services first to the nodes before the forwarding states for the lower ranked services.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any quantity of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A network based on IEEE 802.1aq may implement logical Open Systems Interconnection (OSI) Layer Two (layer 2) services. The Layer 2 services may be used to carry Layer 2 type data traffic that may have different priorities or importance to users and may be associated with a plurality of nodes in a network. The different forwarded data traffic may be ranked to create corresponding priorities in terms of forwarding urgency and/or discard priority on a packet by packet basis. However, the data traffic may not be currently prioritized during fault restoration, such as during the calculation of link states or sub-networks and the downloading of restored forwarding tables. For example, Layer 2 services may comprise Internet Protocol Television (IP-TV) services that may be multicast to a plurality of receivers. Restoring an IP-TV channel after a fault in the network may be more important to some users in comparison to other layer 2 services, and thus the IP-TV services may need to be prioritized accordingly during restoration. Such higher priority services may need to be produced before other services using link state advertisement and computation, such as those implemented in an 802.1aq, a Transparent Interconnect of Lots of Links (TRILL), or a Virtual Private LAN service (VPLS) based network.

Disclosed herein is a system and method for service prioritization in link state controlled Layer 2 networks. The link states may be established using an Intermediate System-Intermediate System (IS-IS) protocol, an Open Shortest Path First (OSPF) protocol, or other network routing protocols. The services may be prioritized at a plurality of switches and/or routers in the network, which may be capable of dynamically creating logical E-LAN services, such as in 802.1aq or VPLS based networks. The method may comprise prioritizing the E-LAN services such that higher priority services may re-established before lower priority service, e.g. after a node or link failure.

Figure 1:
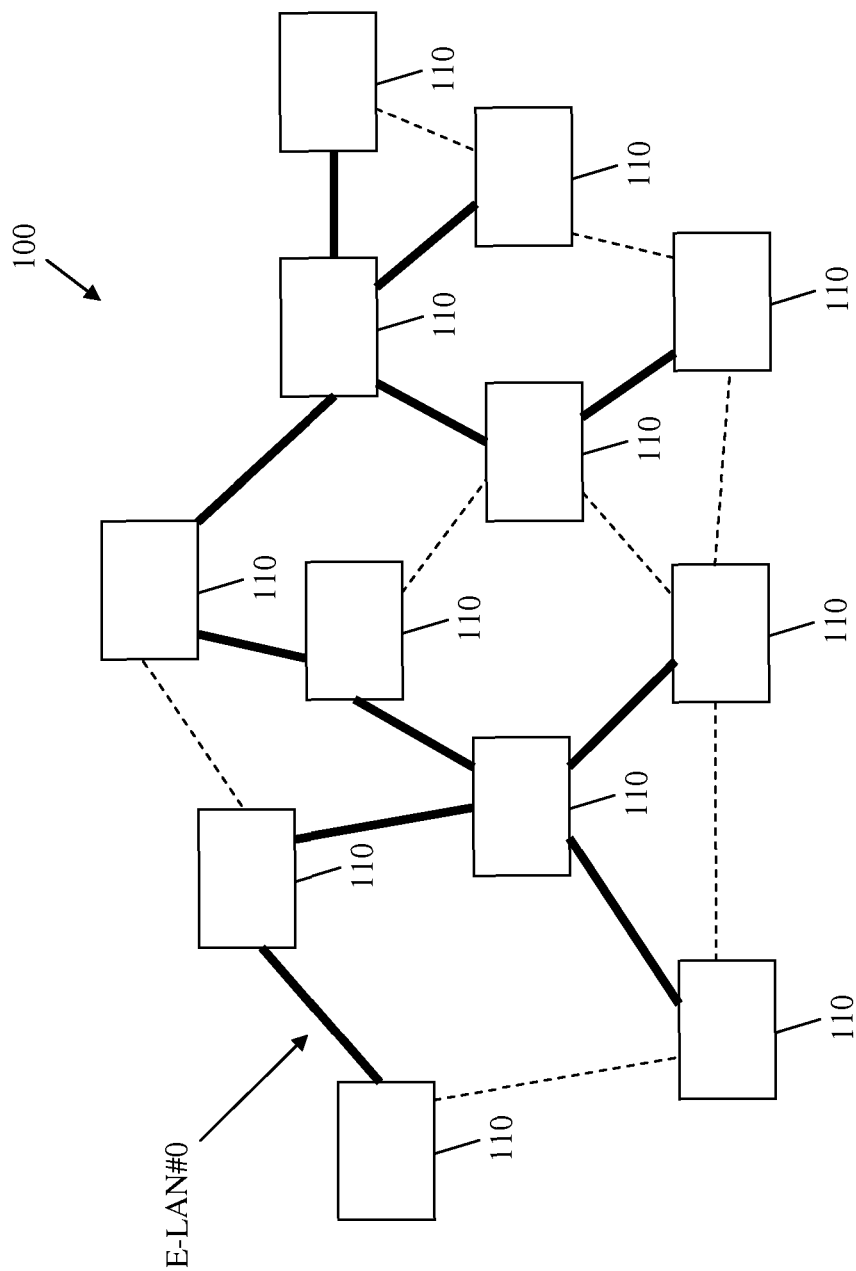
FIG. 1 is a schematic diagram of an embodiment of an E-LAN service based network.

FIG. 1 illustrates one embodiment of an E-LAN service based network 100. The E-LAN service based network 100 may comprise a plurality of nodes 110, which may comprise switches, routers, bridges, or combinations thereof. The nodes 110 may each comprise a plurality of logical and/or physical ports and may be coupled to each other via the ports and a plurality of network links (indicated by the dashed lines). The E-LAN service based network 100 may be any network that establishes E-LAN services between the nodes 110, such as an 802.1aq or VPLS networks. The E-LAN services may correspond to logical Ethernet point-to-point (ptp) or point-to-multipoint (ptmp) sub-networks that may be established between the node 110 to facilitate service forwarding between the associated nodes 110.

For example, an E-LAN service may be established between a subset of the nodes 110 (indicated by the bold solid lines). The E-LAN service may be used to forward service traffic between the subset of nodes 110, for instance by binding the service to a unique identifier of the E-LAN service (e.g. ELAN#0) without using the individual node addresses. Additionally or alternatively, the E-LAN service based network 100 may establish other services similar to the E-LAN services, such as an E-LINE service for ptp communications and/or an E-TREE service for ptmp communications.

Similarly, the same subset of nodes 110 or different subsets of nodes 110 may establish a plurality of E-LAN services that may be used to forward similar or different traffic types. The forwarded traffic may comprise packets, frames, messages, datagrams, signals, or any other type of network traffic. Such E-LAN service may be useful for forwarding multicast traffic to the subset of nodes 110, such as an IP-TV service or channel. The forwarded traffic may correspond to different services that have different priorities in term of forwarding urgency and/or discard priority. The different services may comprise data, voice, video, and/or other specific service content that have different user priorities. For example, video and voice that correspond to real-time communications may have higher priority than some data based services, such as email.

The traffic may be forwarded based on forwarding states, in a forwarding information base (FIB), maintained in the node 110, e.g. along the E-LAN service. The forwarding states or tables may be tables that associate different traffic with corresponding E-LAN services. Typically, during normal network operations, the traffic types that correspond to different services may be forwarded based on assigned service priorities, where higher priority traffic may be forwarded before lower priority traffic at the nodes 110. However, during a network fault, such as a node or link failure, the E-LAN service based network 100 may need to reestablish at least some of the E-LAN services and the forwarding and priority information at the associated nodes 110 may not be valid anymore. The E-LAN services may be reestablished without regard to the previously assigned service priorities and thus some lower priority services may be restored before higher priority services, which may not be acceptable or degrade network performance.

In an embodiment, to avoid delaying the restoration of higher level services more than is necessary, the services may be prioritized before the calculation of new link states for the services, e.g. to obtain new links or paths for the E-LAN services. The new links or paths may be different than the links or paths of the E-LAN services before the network fault since a network or link for the E-LAN services may have failed. During a network fault, the services may be prioritized by associating a priority level or sequence to a plurality of service IDs that correspond to the services and may be communicated to the nodes 110.

A priority may be assigned to a service ID or may be inferred based on the service ID. For instance, higher priority values may be implicitly inferred for service IDs that have lower values, e.g. at the nodes 110. Alternatively, the E-LAN service based network 100 may communicate a field or parameter, which may explicitly assign a priority to a service, and the associated service ID to the nodes 110. As such, the service priorities may be implicitly or explicitly advertised with the service IDs to the nodes 110, e.g. using link state advertisements. For instance, the service IDs may be routed to the nodes using the IS-IS protocol or open shortest path first (OSPF) protocols. In the case of the IS-IS protocol, the service priority may be explicitly advertised in an 802.1aq Intermediate System ID (ISID) field in a IS-IS Type-Length-Value (TLV). Alternatively, the service priority may be indicated by a received ISID value, e.g. in the ISIS TLV.

Table 1 illustrates an example where higher priority values may be implicitly inferred for service IDs that have lower values. For example, the information in Table 1 may be established and maintained in any of the nodes 110. The information may comprise a list of service IDs and a list of implied priorities that correspond to the service IDs. For example, the list of service IDs may include: 4, 10, 1, and 18 and the list of implied priorities may include: second, third, first, and fourth priorities, respectively. Specifically, the service ID with the lowest value, e.g. 1, may be assigned the highest priority (first priority), and the service ID with the second lowest value, e.g. 4, may be assigned the second highest priority (second priority). Similarly, the service IDs with the third lowest value, e.g. 10, and the fourth lowest value, e.g. 18, may be assigned the third highest priority (third priority) and the fourth highest priority (fourth priority), respectively.

TABLE 1

Assigning service priorities implicitly based in service ID values.

| Service ID | Implied Priority |
|---|---|
| 4 | Second |
| 10 | Third |
| 1 | First |
| 18 | Fourth |

Table 2 illustrates an example where priority values may be assigned explicitly with service IDs. For example, the information in Table 2 may be received and maintained in any of the nodes 110. The information may comprise a list of service IDs and a list of explicitly assigned priorities for the service IDs and the corresponding services. For example, the list of service IDs may include: 4, 10, 1, and 18 and the list of corresponding explicitly assigned priorities may include: first, second, third, and fourth. The service IDs may be ordered and sent in the order from higher priority to lower priority. Thus, the service ID 4, 10, 1, and 18 may be assigned the priorities first, second, third, and fourth in the order they are received. Alternatively, both the service IDs and the assigned priorities may be indicated and sent to the node 110, e.g. in a message.

TABLE 2

Assigning priorities explicitly with service IDs.

| Service ID | Implied Priority |
|---|---|
| 4 | First |
| 10 | Second |
| 1 | Third |
| 18 | Fourth |

When the service IDs are associated with the corresponding service priorities at the nodes 110, the nodes 110 may become aware of the service priorities and the E-LAN services may be reestablished (after a network fault) by calculating new link states based on the service priorities. Specifically, the link states may be calculated for higher priority services before lower priority services to limit the recovery delay for high priority services. The nodes 110 may be sorted based on the priority levels or sequences for the service IDs associated with the nodes 110. The service IDs associated with nodes 110 may correspond to the services that originate from the nodes 110. The obtained sequence of ordered nodes 110 based on the service priorities may be used as input to calculate the link states, where the nodes that originate higher priority services may be considered for calculation before the nodes that originate lower priority services. Further, the services associated with each node 110 may be ordered based on the corresponding service priorities and the sequence of ordered services per node may also be used as input to calculate the link states.

In one embodiment that corresponds to an 802.1aq based network, a plurality of service attachment points, e.g. nodes, and a corresponding service ID or ISID may be advertised using the IS-IS protocol. When two attachment points share a common service identifier, the two attachment points may become logically connected and may communicate multicast traffic associated with the service identifier. If a third attachment point is also associated with the same service identifier, all three attachment points may communicate the multicast traffic. The nodes in the network may compute the paths for forwarding the multicast traffic as described in 802.1aq.

In the case of substantially large number of service attachment points in the network, the amount of computations and downloads of forwarding tables by the nodes, e.g. in the core of the network, may become substantially large and time consuming. For example, the time needed to compute the link state and to download the forwarding state for a single service may be relatively fast. However, in the typical case of about ten thousand services, the time needed to restore a service may be on the order of hundreds of milliseconds. Since some of the service may be more important to users than other services, it may be used to order or rank the services according to priority or importance and restore the higher priority services first. The restoration of services may comprise a plurality of steps, which may comprise the calculation of forwarding states and the installation of the calculated forwarding states at the nodes.

In this case, the services may be prioritized and advertised implicitly based on the service IDs or explicitly using message or type-length-value (TLV) fields that indicate the ranks or priority levels, as described above. During the computations, the nodes may be ranked based on the ranks of the services that the nodes originate. For example, the nodes that originate a greater number of higher ranked services may be considered first during the computations. The higher ranked services may also be downloaded first during the downloading of forwarding tables. The combination of advertising the service ranks, ordering the nodes of higher ranked service first during computations, and downloading first the forwarding tables of higher ranked services may result in restoring the higher ranked service first before the lower ranked services.

Figure 2:
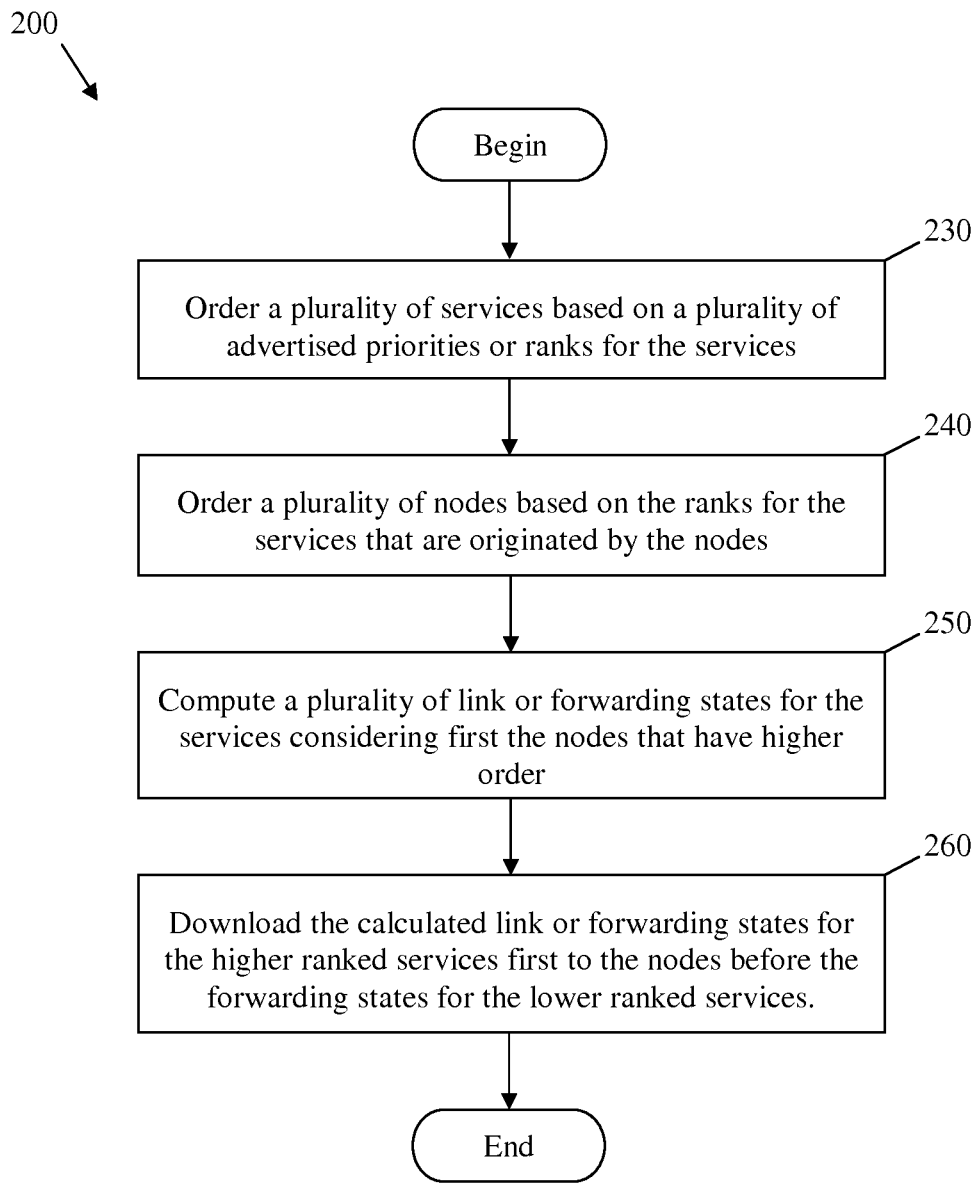
FIG. 2 is a flowchart of an embodiment of a prioritized service restoration method.

FIG. 2 illustrates an embodiment of a prioritized service restoration method 200, which may be used to restore E-LAN or similar services in a network, such in the E-LAN service based network 100. The method 200 may be implemented by the network, a network server, the network management plane, one or more nodes in the network, or combinations thereof. The method 200 may begin at block 230, where a plurality of services may be ordered based on a plurality of advertised priorities or ranks for the services. For instance, the network may detect a node or link failure that may be associated with an established E-LAN service. The network may then advertise the priorities or ranks of a plurality of services to a plurality of nodes. The service IDs and the service priorities or ranks may be advertised, e.g. to the nodes, implicitly or explicitly, as described above. The nodes may then order the services that have higher ranks before the lower ranked services.

At block 240, a plurality of nodes may be ordered based on the ranks for the services that are originated by the nodes. As such, the nodes that originate services that have higher ranks may be ordered first before the nodes that originate lower ranked services. At block 250, a plurality of link or forwarding states for the services may be computed considering first the nodes that have higher order. At block 260, the calculated link or forwarding states for the higher ranked services may be downloaded first to the nodes before the forwarding states for the lower ranked services. Thus, the nodes may receive the forwarding states for the higher ranked services first and restore the higher ranked services before the lower ranked services. The method 200 may then end.

A node may receive and maintain the downloaded forwarding states and corresponding service IDs, which may be ordered in sequence from higher priority to lower priority link state based services. Thus, the node may restore the link state based services, e.g. instantiate work on the forwarding states, based on the ordered sequence from higher priority to lower priority link state based services. The node may also forward traffic on the forwarding states based on the same ordered sequence. The work instantiated on the forwarding states may comprise central processing unit (CPU) utilization, for example to process the forwarded traffic or other data between nodes. The work may also comprise task movement between resources.

Figure 3:
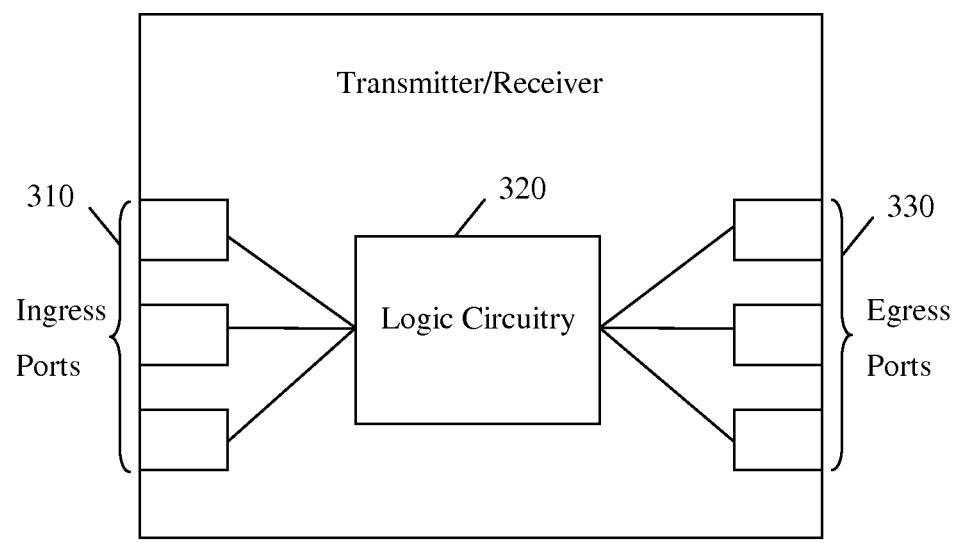
FIG. 3 is a schematic diagram of an embodiment of a transmitter/receiver unit.

FIG. 3 illustrates an embodiment of a transmitter/receiver unit 300, which may be located at or coupled to any of the components described above, e.g. in the group-based multicast architecture 100. The transmitter/receiver unit 300 may be any device that transports data through the network. For instance, the transmitter/receiver unit 300 may correspond to or may be located in any of the nodes 110. The transmitted/receiver unit 300 may comprise a plurality of ingress ports or units 310 for receiving frames, objects, or type-length-values (TLVs) from other nodes, logic circuitry 320 to determine which nodes to send the frames to, and a plurality of egress ports or units 330 for transmitting frames to the other nodes. The transmitter/receiver unit 300 may also comprise a buffer (not shown) between the ingress ports 310 and the logic circuit 320 and/or between the logic circuit 320 and the egress node 330.

Figure 4:
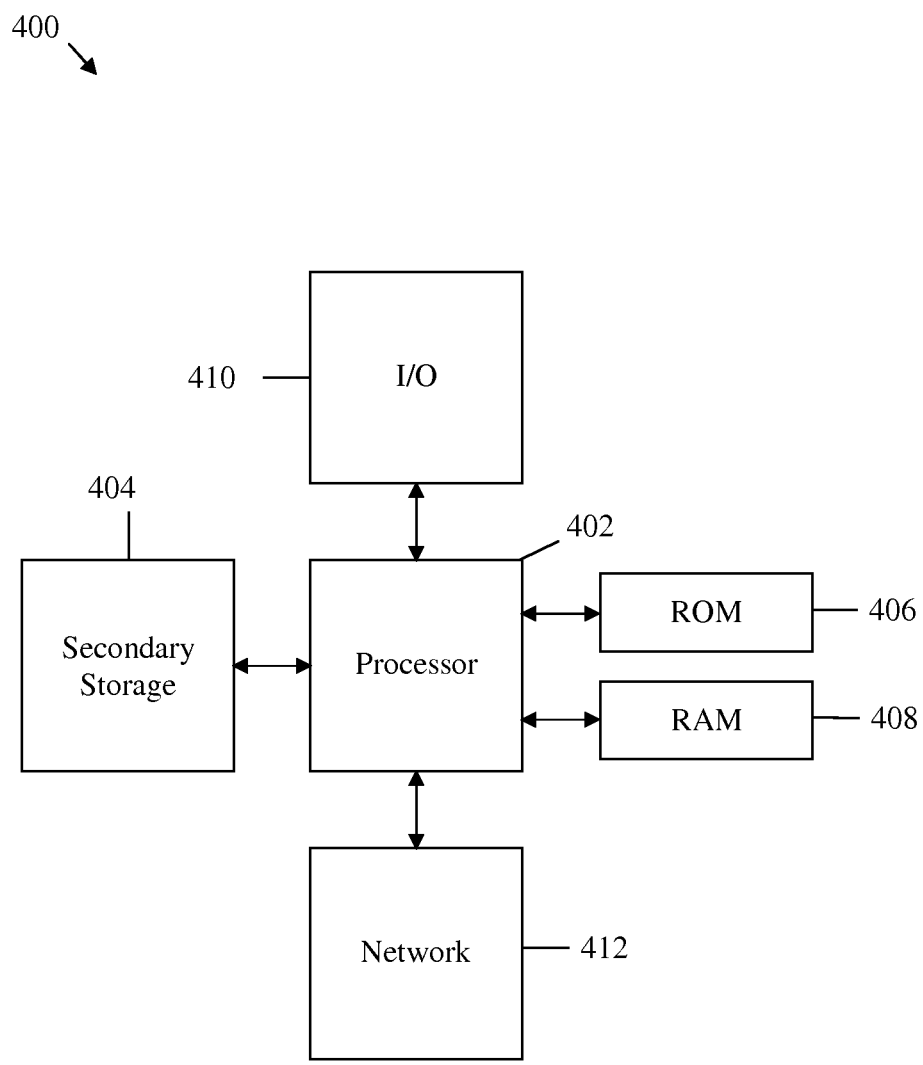
FIG. 4 is a schematic diagram of an embodiment of a general-purpose computer system.

The network components (e.g. the nodes 110) described above may be implemented on any general-purpose network component, such as a computer or network component with sufficient processing power, memory resources, and network throughput capability to handle the necessary workload placed upon it. FIG. 4 illustrates a typical, general-purpose network component 400 suitable for implementing one or more embodiments of the components disclosed herein. The network component 400 includes a processor 402 (which may be referred to as a CPU that is in communication with memory devices including secondary storage 404, read only memory (ROM) 406, random access memory (RAM) 408, input/output (I/O) devices 410, and network connectivity devices 412. The processor 402 may be implemented as one or more CPU chips, or may be part of one or more application specific integrated circuits (ASICs).

The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g. from about 1 to about 10 includes 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for service prioritization after a failure within a network, comprising:
    a processor configured to:
        maintain a plurality of downloaded forwarding states for a plurality of link state based services that originate from a plurality of nodes in the network and a plurality of advertised service identifiers (IDs) that correspond to the link state based services, wherein each of the nodes are associated with at least one of the service IDs;
        detect a failure within the network;
        prioritize the link state based services based on the advertised service IDs associated with the link state based services;
        advertise one or more priority levels of the link state based services to the plurality of nodes;
        order the plurality of nodes based on the priority levels of the service IDs associated with each of the nodes and based on a number of higher priority level services that originate from the nodes,
        wherein ordering the nodes based on the priority levels of the service IDs associated with each of the nodes comprises ordering the nodes from highest priority level to lowest priority level; and
        restore at least one of the link state based services using the priority level of the link state based services subsequent to detecting the failure within the network,
        wherein restoring the at least one of the link state based services is based on the ordering of the nodes, and
        wherein services for link state based services that have higher priority level are restored before the link state based services that have lower priority level.

2. The apparatus of claim 1, wherein the service IDs are ordered based on values of the service IDs such that the service IDs that have the lower values have higher priority than the service IDs that have higher values.

3. The apparatus of claim 1, wherein the service IDs are ordered based on a plurality of advertised fields that correspond to the service IDs and indicate the priority level of the corresponding link state based services, and wherein the network is a distributed computation system.

4. The apparatus of claim 1, wherein the link state based services comprise Ethernet-Local Area Network (E-LAN) services, E-TREE services, E-LINE services, or combinations thereof, wherein the link state based services are configured in a tree topology.

5. The apparatus of claim 1, wherein the link state based services are Institute of Electrical and Electronics Engineers (IEEE) 802.1aq based services at the Open Systems Interconnection (OSI) network Layer Two (layer 2) or Virtual Private Local Area Network (LAN) based services (VPLS).

6. The apparatus of claim 1, wherein the link state based services are established using an Intermediate System-Intermediate System (IS-IS) protocol, an Open Shortest Path First (OSPF) protocol, or a Transparent Interconnect of Lots of Links (TRILL) protocol.

7. The apparatus of claim 1, wherein restoring the link state based services comprises calculating the forwarding states for the link state based services, and wherein ordering the nodes is based on the priority level of the link state based service that is originated at each of the nodes.

8. The apparatus of claim 1, wherein the processor is further configured to compute a plurality of forwarding states for one or more of the nodes that follows the ordering of the nodes.

9. A network component comprising:
a receiver configured to receive a plurality of ordered service identifiers (IDs) that correspond to a plurality of services, wherein the network component is associated with at least one of the services;
a circuit configured to:
  detect a fault within a network;
  order the service IDs in sequence based on priorities of the corresponding services from higher priority to lower priority services;
  determine an order value for the network component based on the priorities of the services that are associated with the network component;
  calculate a plurality of forwarding states that correspond to at least one of the services after detecting the fault, wherein the forwarding states for services with the higher priorities are calculated before the services with the lower priorities; and
  restore the network component in order based on an order value of the network component; and
a transmitter configured to transmit the ordered service IDs and the forwarding states that correspond to the services in a sequence from higher priority to lower priority services,
wherein the order value is used to provide a sequence order for the network component and a plurality of nodes,
wherein determining the order value for the network component comprises:
  ordering the network component with respect to the nodes based on the priority of the services associated with the network components and the nodes from the higher priorities to the lower priorities; and
  ordering the network component based on a number of higher priority services that originate from the network component.

10. The network component of claim 9, wherein the service IDs correspond to a plurality of Institute of Electrical and Electronics Engineers (IEEE) 802.1aq Intermediate System ID (ISID) values, and wherein the service IDs are ordered according to the corresponding IEEE 802.1aq ISID values from lower ISID values to higher ISID values.

11. The network component of claim 10, wherein a plurality of rank fields associated with the ISID values are received with the ISID values, and wherein the service IDs are ordered according to the rank fields from higher rank values to lower rank values.

12. The network component of claim 9, wherein some of the services are affected by the fault, wherein the circuit is further configured to calculate forwarding tables for only the services affected by the fault, and wherein the services comprise Ethernet Local Area Network (E-LAN) services.

13. The network component of claim 9, wherein the service IDs are prioritized based on the order the receiver received the service IDs, and wherein the order value is based on the service that is originated from the network component.

14. The network component of claim 9, wherein the plurality of forwarding states are calculated for each of the nodes based on the priorities of the nodes and the network component.

15. A computer-implemented method for service prioritization after a failure within a network, wherein the method comprises:
detecting a fault within the network that comprises a plurality of nodes;
ordering a plurality of link state based services based on a plurality of advertised ranks for the link state based services;
ordering the nodes based on priority levels of the link state based services that are associated with each of the nodes, wherein each node is associated with at least one link state based service;
computing a plurality of forwarding states for the link state based services using the order of the nodes in response to the fault, wherein the forwarding states for the nodes that have lower ranks are computed after the forwarding states for the nodes that have higher ranks; and
downloading the computed forwarding states for the higher ranked services before downloading the computed forwarding states for the lower ranked services, wherein ordering the nodes based on the priority levels of the link state based services comprises:
ordering the nodes from a higher priority to a lower priority; and
ordering the nodes based on a number of higher priority services that originate from the nodes.

16. The method of claim 15, wherein the ranks for the link state based services are advertised after detecting a network fault, and wherein the link state based services comprise Ethernet Local Area Network (E-LAN) services.

17. The method of claim 15, wherein the forwarding states for the link state based services that have higher ranks are restored first after downloading the forwarding states to the nodes, and wherein ordering the nodes is based on the priority level of the link state based service that is originated from each of the nodes.

18. The method of claim 15 further comprising:
ordering the plurality of link state based services per node;
computing the plurality of forwarding states for the link state based services based on the ordered link state based services per node; and downloading the computed forwarding states based on ordering the nodes from the higher priority to the lower priority.

19. The apparatus of claim 7, wherein restoring the link state based services further comprises installing the calculated forwarding states.

* * * * *